(12) United States Patent
Mistry et al.

(10) Patent No.: US 7,947,317 B2
(45) Date of Patent: May 24, 2011

(54) INTERCONNECTED CONFECTIONERY PRODUCTS AND METHOD OF MAKING AND MARKETING SAME

(75) Inventors: Atul Mistry, Branchburg, NJ (US); Laura E. Krusch, Hoboken, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 38 days.

(21) Appl. No.: 11/444,766

(22) Filed: Jun. 1, 2006

(65) Prior Publication Data
US 2006/0286284 A1 Dec. 21, 2006

Related U.S. Application Data

(60) Provisional application No. 60/686,202, filed on Jun. 1, 2005.

(51) Int. Cl.
*A23G 3/00* (2006.01)
(52) U.S. Cl. ........ 426/103; 426/104; 426/289; 426/578; 426/660
(58) Field of Classification Search .............. 426/5, 103, 426/104, 112, 392, 394, 578, 289, 292, 295, 426/660; 127/32
See application file for complete search history.

(56) References Cited

U.S. PATENT DOCUMENTS

| | | | | |
|---|---|---|---|---|
| 260,055 | A * | 6/1882 | Schwarzschild | 229/87.08 |
| 1,628,121 | A * | 5/1927 | Covel | 229/116.5 |
| 1,755,234 | A * | 4/1930 | Westerfield | 206/443 |
| 1,910,536 | A * | 5/1933 | Guggenheim | 118/16 |
| 2,102,971 | A * | 12/1937 | Petremont | 426/87 |
| 2,106,097 | A * | 1/1938 | Homan | 426/104 |
| D108,726 | S * | 3/1938 | Brodes | D1/127 |
| 2,625,903 | A * | 1/1953 | Opie | 118/19 |
| D169,265 | S * | 4/1953 | Lavezzorio | D9/625 |
| 2,903,365 | A | 9/1959 | O'Brian et al. | |
| 3,492,131 | A | 1/1970 | Schlatter | |
| 3,717,475 | A * | 2/1973 | Germino | 426/578 |
| 4,032,661 | A | 6/1977 | Rowsell et al. | |
| 4,136,163 | A | 1/1979 | Watson et al. | |
| 4,163,065 | A * | 7/1979 | Cilek | 426/94 |
| 4,225,627 | A * | 9/1980 | Moore | 426/548 |
| 4,230,688 | A | 10/1980 | Rowsell et al. | |

(Continued)

FOREIGN PATENT DOCUMENTS

JP 2004065035 A * 3/2004

(Continued)

OTHER PUBLICATIONS http://web.archive.org/web/20031113082538/http://www.hometownfavorites.com/shop/candy_cat.asp?c=12&p=2&id=907 &newp = 2003; Hand Annotated Document.*

(Continued)

*Primary Examiner* — Drew E Becker
*Assistant Examiner* — Steven Leff
(74) *Attorney, Agent, or Firm* — Hoffmann & Baron, LLP

(57) ABSTRACT

Confectionery products, packages containing confectionery products and methods for marketing same are disclosed. The products permit the consumer to manipulate them into composite shapes having various flavor, color, and/or texture combinations. Additionally, packages containing a plurality of resiliently deformable candy pieces are disclosed. The packages provide indicia in the form of graphic and textural information regarding the contents and how to use the pieces to create composite shapes having various flavor, color and/or texture combinations.

14 Claims, 5 Drawing Sheets

U.S. PATENT DOCUMENTS

| | | | |
|---|---|---|---|
| 4,279,931 A | | 7/1981 | Verwaerde et al. |
| 4,459,425 A | | 7/1984 | Amano et al. |
| 4,619,834 A | | 10/1986 | Zanno et al. |
| 4,828,854 A | * | 5/1989 | Beer .......................... 426/104 |
| 4,913,924 A | * | 4/1990 | Moore ......................... 426/578 |
| 4,966,542 A | * | 10/1990 | Kobayashi ................... 425/307 |
| 5,266,592 A | | 11/1993 | Grub et al. |
| 6,562,382 B1 | * | 5/2003 | Corriveau et al. ................ 426/5 |
| 6,572,904 B2 | * | 6/2003 | Rhee .............................. 426/87 |
| 6,627,233 B1 | | 9/2003 | Wolf et al. |
| 2003/0152668 A1 | * | 8/2003 | Griffin ........................ 426/104 |
| 2005/0019453 A1 | * | 1/2005 | Witkowski ................... 426/106 |
| 2006/0003055 A1 | * | 1/2006 | Witkowski ................... 426/104 |

FOREIGN PATENT DOCUMENTS

| | | |
|---|---|---|
| WO | WO 2005/122781 | 12/2005 |

OTHER PUBLICATIONS

JP 2004065035 Machine generated translation.*

Voragen et al., "Rheological Characterization of Gum and Jelly Products", Advances in Pectin and Pectinase Research, 2003, pp. 449-465.

Eves, Anita, et al., "The Texture of Confectionary", Chemistry & Industry, Feb. 3, 1992, pp. 95-97.

Rassing, M., et al., "Chewing gum as a drug delivery system", 2 ed., Ellermann Carecom International, 2003, pp. 1-17.

Sutherland, J.M., et al., "Buccal absorption of ergotamine", J. Neurology, Neurosurgery, and Psychiatry, Oct. 1974; vol. 37, No. 10, pp. 1116-1120.

Kamimori, G.H., et al., "The rate of absorption and relative bioavailability of caffeine administered in chewing gum versus capsules to normal healthy volunteers", International Journal of Pharmaceutics, vol. 234 (2002); pp. 159-167.

* cited by examiner

INTERCONNECTED CONFECTIONERY PRODUCTS AND METHOD OF MAKING AND MARKETING SAME

CROSS-REFERENCE TO RELATED APPLICATIONS

This application claims the benefit of U.S. Provisional Application No. 60/686,202, filed Jun. 1, 2005, the contents of which are incorporated herein by reference.

FIELD

The present invention is directed generally to confectionery products such as candy, a plurality of which can be interconnected to form a composite confectionery structure. More particularly, the present invention relates to confectionery products and packages therefore and a method for marketing the packaged confectionery products.

BACKGROUND

Successful marketing of confectionery products such as candy is dependent on a wide variety of factors. Quality of the product with respect to taste, flavor and texture is paramount. However, the desirability of certain candy products especially those targeted to children is often dependent on other factors. Many non-taste related attributes must be considered in bringing a candy product to market.

Packaging is a significant consideration. Not only does the package need to contain and dispense the candy, but the package must be designed to be appealing to the consumer. Often packaging is a primary factor in a consumer's purchasing decision. Pez® candy dispensers is one famous example of packaging providing added value to the candy itself.

Product configuration is also a factor which may tend to promote enhanced desirability. The shape of the product, if seen as desirable to a consumer, will often be a significant factor in the purchasing decision. Animal Crackers® is a famous example of product shape which was found to be successful.

Moreover, certain successful candy products become popular due to the ability of the consumer to manipulate the individual candy pieces. For example, Twizzler® licorice, candy straws, candy laces and the like allow the child to "play" with the candy pieces prior to consumption.

SUMMARY

Some embodiments provide a confectionery product which may be manipulated by the user to form different shapes and configurations. The confectionery product includes a first elongate member having a first configuration which is deformable under an applied first manual pressure. The first elongate member is substantially returnable to the first configuration upon release of the applied manual pressure. The first elongate member is deformable to at least a second different configuration under a second manual pressure greater than the first manual pressure and will maintain the second configuration upon release of the second manual pressure.

In some embodiments, the first configuration of the elongate member is generally C-shaped having a central portion and distal ends defining a gap therebetween. The central portion of the elongate member generally has a uniform transverse dimension between the distal ends. The transverse dimension is greater than the gap between the distal ends. Two such elongate members may be mutually attached to form a composite structure. One of the elongate members central portion may be inserted between the gap of the other elongate member to define an interlocked structure.

In some embodiments there is provided, in combination, a plurality of confectionery products and a package for enclosing the confectionery products. Each confectionery product may include a deformable elongate member where at least two of the deformable members are interconnected to define one of a plurality composite structure. The package may include indicia thereon providing examples of at least one of said plurality of composite structures.

In other embodiments, a method of marketing a confectionery product is provided which includes providing a plurality of deformable confectionery members in a package. At least two of the members are deformably interconnected to form one of a plurality of differently shaped composite structures. Indicia is placed on the package to include examples of at least one of said plurality of differently shaped composite structures.

DETAILED DESCRIPTION

Figure 1:
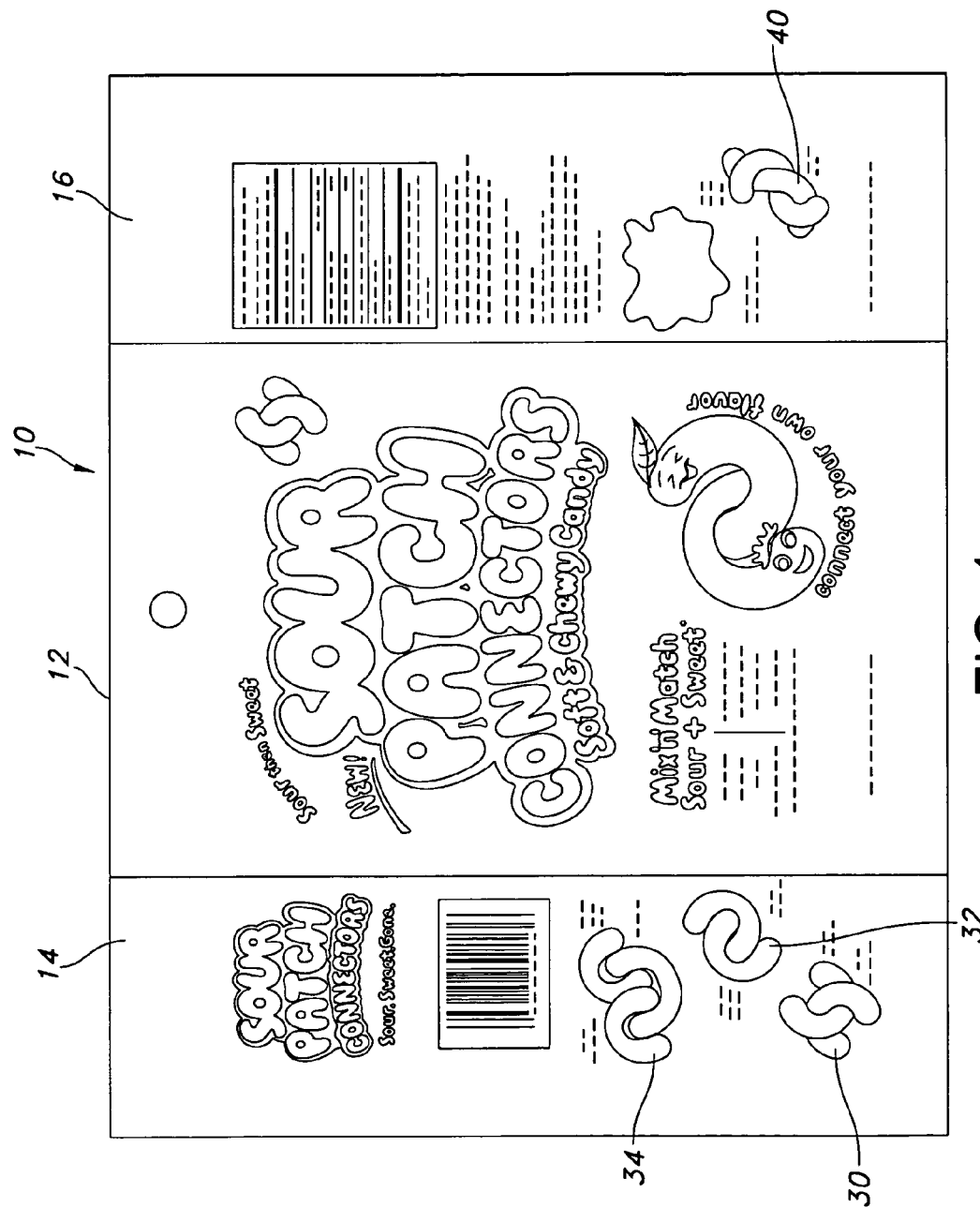
FIG. 1 is a sample package of some embodiments which includes candy pieces of the present invention and indicia providing graphic examples of composite structures which may be formed from the candy pieces.

The present invention provides confectionery products, more specifically, candy pieces which by virtue of their composition are resiliently deformable thereby permitting two or more of such candy pieces to be interconnected to form a composite structure. The composite structure may take different shapes and forms depending upon the imagination of the user. The candy pieces may be contained within a package and the package may include indicia thereon providing examples of composite structures into which the candy pieces may be combined.

It is further contemplated that the candy pieces can be of different colors, flavors, tastes, textures and the like so that the purchaser may interconnect a variety of different candy pieces together to form various color, flavor, taste, and texture combinations. As an example, candy pieces may be provided in what are known as sweet and sour tastes and flavors. This can allow the purchaser to combine at least one candy piece characterized as sweet with at least one candy piece characterized as sour to create a sweet/sour candy composite. Also, in some embodiments, various flavors can be combined to define different flavors of candy combinations, including tangerine/strawberry cream, lemon/tropical punch, cherry/bubble gum, blue raspberry/cotton candy, to name a few.

The consumer may thus combine the various flavored pieces to create their own flavored composite piece. In some embodiments, the consumer may combine at least two sweet pieces of candy. In another embodiment, the consumer may combine at least two sour pieces. In still other embodiments, the consumer may combine at least one sour and at least one sweet piece of candy.

As may be appreciated, in some embodiments, even different textured candies can be combined to define a candy composite.

The present invention also provides packaging for containing the candy pieces. The packaging may include thereon examples of the different candy configurations including flavors and textures. The package may also include various examples of composite candy which may be formed by combining two or more of the candy pieces contained within the package.

The compositions of the present invention are designed to be chewable confectionery compositions which permit manipulation into different forms and shapes by the consumer. Various shapes may be included in the package to be sold to the consumer, the shapes permitting resilient deformation upon manipulation by the consumer.

In some embodiments, the composition may be designed to provide a soft chew to the consumer. The confectionery product, i.e., the candy pieces to be consumed, may be coated with particles or granules of various materials, such as sweetener and/or acid granules, in order to provide additional sweet and/or sour tastes to the product, as well as a texture which compliments the chewiness of the product. These particulate coatings may provide crunchiness to the product, as well as serving to permit frictional engagement when two candy surfaces are interlocked or otherwise fitted together. The granules thus provide a greater frictional surface than the chewy candy composition over which they are applied.

In some embodiments, the surface of the composition may be treated with a hydrophilic material such as a fat, oil, wax or the like. In these embodiments, the individual confectionery pieces are fitted together to form a composite based on a lower frictional surface phenomenon.

A variety of different flavors may be included. In some embodiments, each candy piece has its own flavor and sweetness or sourness. The individual candy pieces may be mixed and matched to provide a composite sweet/sour composite piece as described herein.

In general, the confectionery compositions may include water in amounts of about 5% to about 20% by weight of the total composition. The sweetener present in the confectionery compositions may include corn syrup, sucrose (sugar) and invert sugar (glucose and fructose) among other sweeteners in any desired amount. Specifically, sugar may be included in amounts of about 35% to about 65% by weight of the total composition. Corn syrup, such as Glucose 63DE (a corn syrup available from CASCO having 63% dextrose equivalent), may be included in amounts of about 5% to about 15% by weight of the total composition. Invert sugar may be included in amounts of about 8% to about 22% by weight of the total composition.

The starch component in some embodiments of the confectionery compositions may be any which produces a desirable starch-based candy product such as high-amylose starches, including modified corn starch and thin-boiling starches. Starch may be present in an amount from about 4% to about 14% by weight of the total composition. Specifically, in some embodiments, thin boiling starch may be present in amount of about 4% to about 14% by weight of the total composition.

The above-mentioned components may be varied to modify the chewiness and overall texture of the confectionery piece.

Various acids or acidulants may be incorporated into the composition, separate and apart from those used in granulated or particulate form on the surface of the confectionery piece. Among the food acids useful include acetic acid, phosphoric acid, citric acid, tartaric acid, lactic acid, malic acid, ascorbic acid, fumaric acid, glucono-deta-lactone, adipic acid and combinations thereof. Salts of these acids, such as the sodium, potassium, ammonium, calcium and magnesium salts, may also be used. The amount of acid or combinations of acids will vary depending on the chosen flavor. In general, the amount of food acid may be present in about 0.01 to about 1.5% by weight of the total composition, and more desirably in amounts of about 0.5 to about 1.1% by weight of the total composition.

The term "confections" will include chewable jelly gum or "gummy" confections. Also included in those chewable forms are gum drops, licorice and jelly beans. The basis of jelly gum confections is a sugar/glucose syrup combination and a gelatinizing agent, the latter of which may be gelatin, agar, gum arabic, maltodextrin, pectin or a modified starch. Various other gums may also be used. The gelatinizing material is desirably dissolved in water prior to mixing with the sugar/glucose syrup combination. If pectin is used as the gelatinizing agent, then the pectin is desirably dry mixed with the sugar prior to addition of the dry mixture to water.

Jelly gum compositions may include a variety of components which are well-known in the art. Among the many suitable components are corn syrup, fruit juice concentrates, sugar, gelatin, starch, pectin, sorbitol, food acids, colors, flavorings, high fructose corn syrup, sodium citrate, warming and cooling agents, and combinations thereof.

Any of a variety of active components may be included in the present embodiments. These include sweeteners, flavors, breath-freshening agents, medicaments or pharmaceutical actives, such as analgesics, anti-histamines, decongestants, and antacids, vitamins and other dietary supplements, breath freshening agents, caffeine, nicotine, and combinations thereof.

Bulk sweeteners include sugars, sugarless bulk sweeteners, or the like, or mixtures thereof. Bulk sweeteners generally are present in amounts of about 5% to about 99% by weight of the chewing gum composition. Suitable sugar sweeteners generally include mono-saccharides, di-saccharides and poly-saccharides such as but not limited to, sucrose (sugar), dextrose, maltose, dextrin, xylose, ribose, glucose, mannose, galactose, fructose (levulose), invert sugar, fructo oligo saccharide syrups, partially hydrolyzed starch, corn syrup solids and mixtures thereof.

Suitable sugarless bulk sweeteners include sugar alcohols (or polyols) such as, but not limited to, sorbitol, xylitol, mannitol, galactitol, maltitol, hydrogenated isomaltulose (ISOMALT), lactitol, erythrytol, hydrogenated starch hydrolysate, stevia, lo han quo, and mixtures thereof.

Suitable hydrogenated starch hydrolysates include those disclosed in U.S. Pat. No. 4,279,931 and various hydrogenated glucose syrups and/or powders which contain sorbitol, maltitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Del., are also useful.

In some embodiments, high-intensity sweeteners also may be included as sweetening agents in the compositions. Without being limited to particular sweeteners, representative categories and examples include:

(a) water-soluble sweetening agents such as dihydrochalcones, monellin, stevia, steviosides, rebaudioside A, glycyrrhizin, dihydroflavenol, and sugar alcohols such as sorbitol, mannitol, maltitol, xylitol, erythritol and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), N-[N-(3,3-dimethylbutyl)-L-aspartyl]-L-phenylalanine 1-methyl ester (Neotame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo -furanoside, or 4,1'-dichloro-4,1'-dideoxygalactosucrose; 1',6'-dichloro 1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; and 4,6,1',6'-tetradeoxy-sucrose, and mixtures thereof;

(e) protein based sweeteners such as thaumatococcus danielli (Thaumatin I and II) and talin;

(f) the sweetener monatin (2-hydroxy-2-(indol-3-ylmethyl)-4-aminoglutaric acid) and its derivatives; and (g) the sweetener Lo han guo (sometimes also referred to as "Lo han kuo").

The intense sweetening agents may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof. They may be used in the confectionery composition, as a coating on the composition, as part of a particulate or granulated texturizing surface composition, or as a combination of any of these.

In general, an effective amount of intense sweetener may be utilized to provide the level of sweetness desired, and this amount may vary with the sweetener selected. The intense sweetener may be present in amounts from about 0.001% to about 3%, by weight of the total composition, depending upon the sweetener or combination of sweeteners used. The exact range of amounts for each type of sweetener may be selected by those skilled in the art.

In some embodiments wherein a high intensity sweetener is included, the sweetener may be sucralose, saccharin salts, acesulfame potassium, aspartame, thaumatin, monatin (2-hydroxy-2-(indol-3-ylmethyl)-4-amino glularic acid), neotame, alitame, and combinations thereof.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, watermelon, apricot, banana, melon, apricot, ume, cherry, raspberry, blackberry, tropical fruit, mango, mangosteen, pomegranate, papaya and so forth. Other potential flavors include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a camomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with cooling agents.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference. This may include natural as well as synthetic flavors.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, and mixtures thereof.

In some embodiments, a flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well-known.

In some embodiments, the flavoring agents may be used in many distinct physical forms. Without being limited thereto, such physical forms include free forms, such as spray dried, powdered, beaded forms, encapsulated forms, and mixtures thereof.

The amount of flavoring agent employed herein may be a matter of preference subject to such factors as the type of final jelly gum composition, the individual flavor, and the strength of flavor desired. Thus, the amount of flavoring may be varied in order to obtain the result desired in the final product. In jelly gum compositions, the flavoring agent is generally present in amounts from about 0.02% to about 5%, and more specifically from about 0.1% to about 2%, and even more specifically, from about 0.8% to about 1.8%, by weight of the jelly gum composition.

Coloring agents may be used in amounts effective to produce the desired color. The coloring agents may include pigments which may be incorporated in amounts up to about 6%, by weight of the composition. For example, titanium dioxide may be incorporated in amounts up to about 2%, and preferably less than about 1%, by weight of the composition. The colorants may also include natural food colors and dyes suitable for food, drug and cosmetic applications. These colorants are known as F.D. & C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Useful warming agents include those having at least one allyl vinyl component, which may bind to oral receptors. Examples of suitable warming agents include, but are not limited to: vanillyl alcohol n-butylether (TK-1000, supplied by Takasago Perfumery Company Ltd., Tokyo, Japan); vanillyl alcohol n-propylether; vanillyl alcohol isopropylether; vanillyl alcohol isobutylether; vanillyl alcohol n-aminoether; vanillyl alcohol isoamylether; vanillyl alcohol n-hexylether; vanillyl alcohol methylether; vanillyl alcohol ethylether; gingerol; shogaol; paradol; zingerone; capsaicin; dihydrocapsaicin; nordihydrocapsaicin; homocapsaicin; homodihydrocapsaicin; ethanol; isopropyl alcohol; iso-amylalcohol; benzyl alcohol; glycerine; chloroform; eugenol; cinnamon oil; cinnamic aldehyde; phosphate derivatives thereof; and combinations thereof.

In some embodiments, a variety of well-known cooling agents may be employed. For example, among the useful cooling agents are included xylitol, erythritol, dextrose, sorbitol, menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-p-menthane-3-carboxamide (WS-3), isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehtha-3,8-Diol), cineol, Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; and Menthol methyl ether, and menthyl pyrrolidone carboxylate among others. These and other suitable cooling agents are further described in the following U.S. patents, all of which are incorporated in their entirety by reference hereto: U.S. Pat. Nos. 4,230,688; 4,032,661; 4,459,425; 4,136,163; 5,266,592; 6,627,233.

A variety of drugs, including medications, herbs, and nutritional supplements may also be included and may optionally be encapsulated. Examples of useful drugs include ace-inhibitors, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra®, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

In addition to the components set out above, the jelly gum compositions may include a variety of other components such as solvents, emulsifiers, plasticizers, fillers, and mixtures thereof.

The jelly gum compositions may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. The emulsifier may be employed in amounts from about 2% to about 15%, and more specifically, from about 7% to about 11%, by weight of the total composition.

The jelly gum compositions may also include plasticizers or softeners to provide a variety of desirable textures and consistency properties. Because of the low molecular weight of these ingredients, the plasticizers and softeners are able to penetrate the fundamental structure of the jelly gum composition making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be included. The plasticizers and softeners are generally employed in the compositions in amounts up to about 20% by weight of the total composition, and more specifically in amounts from about 9% to about 17%, by weight of the total composition.

Plasticizers also include are the hydrogenated vegetable oils and include soybean oil and cottonseed oil which may be employed alone or in combination. These plasticizers provide the composition with good texture and soft chew characteristics. These plasticizers and softeners are generally employed in amounts from about 5% to about 14%, and more specifically in amounts from about 5% to about 13.5%, by weight of the total composition.

Anhydrous glycerin may also be employed as a softening agent, such as the commercially available United States Pharmacopeia (USP) grade. Glycerin is a syrupy liquid with a sweet warm taste and has a sweetness of about 60% of that of cane sugar. Because glycerin is hygroscopic, the anhydrous glycerin may be maintained under anhydrous conditions throughout the preparation of the composition.

In some embodiments, the compositions of some embodiments may also include effective amounts of bulking agents such as sugars or sugar alcohols, which provide bulk in addition to sweetness. These bulking agents may be used in various amounts. The amount of bulking agent may be present in an amount from about zero to about 40%, and more specifically from about zero to about 30%, by weight of the total composition. In some embodiments, the amount of bulking agent will be from about zero to about 15%, more specifically from about 3% to about 11%.

A variety of traditional components may be optionally included in some embodiments in effective amounts such as coloring agents, antioxidants, preservatives, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included.

As mentioned above, a variety of flavors may be incorporated into the compositions. These flavors may be used alone, for individual pieces, or may be combined in a single piece depending on the desired end product. For example, a single piece may be partially watermelon flavored and partially strawberry flavored, the flavors may be blended in the composition or separated out into portions of a single confectionery piece. As mentioned previously, the two or more single pieces may be interconnected to form a multi-flavored composite.

A package containing the confectionery pieces may provide a mixture of various flavored and textured pieces. For example, one package may have a certain percentage of cherry pieces, a certain percentage of tropical punch pieces, a certain percentage of strawberry cream pieces, a certain percentage of bubble gum pieces, a certain percentage of tangerine pieces, a certain percentage of blue raspberry pieces, a certain percentage of lemon pieces and/or a certain percentage of cotton candy pieces. These and other flavored pieces may be combined in a single package to permit the consumer to mix and match the variety of flavors and textures to provide a desirable organoleptic experience. For example, a composite piece formed by the consumer may provide an initial sour taste, followed by the sweet taste, or vice versa.

The compositions may be formed by a variety of processes. For example, the sugar, starch, Glucose 63 DE and water may be blended and heated together to form a substantially homogeneous mixture. More volatile components, such as flavors, colors and acidents (acids) may then be added to this mixture prior to formation of the candy shape. This admixture may then be placed in molds designed to provide them with the specified shape, extruded into the desired shape or formed into sheets of confectionery product from which the desired shape can be cut.

The thus formed and shaped confectionery products may then be coated with a variety of different materials, such as sweetening compositions and/or flavoring compositions. The coating may be added by any method known in the art such as by sugar sanding. The sugar sanding method includes first damping the starch-based jelly confection by treatment with steam. The damped confection is then contacted with the particulate coating by dusting, or by placing the confection in the coating mixture. After the desired contact with the coating is achieved, the confections are dried, optionally at raised temperatures. In some embodiments, these coatings are in the form of granulations which may provide texture, sweetness, sourness or a combination thereof.

In other embodiments, a surface treatment, such as an oil coating or fat or wax coating may be applied to the confectionery product. Harder fats or waxes may be used, for example, to provide an almost opaque "crust" coating to the product. Suitable fats include, but are not limited to, acetylated mono- or diglycerides.

In some embodiments, for instance, the confectionery product may include at least one elongate member, as discussed in more detail below. The coating may be applied to the elongate member such that it at least partially surrounds the member. In some embodiments, the coating may fully surround the elongate member.

The confectionery pieces are then placed in packages. As mentioned herein, the packaging graphics desirably provides indicia which gives information about the product contained therein. This indicia may provide information in the form of drawings or graphics depicting the shapes of individual pieces contained in the package, as well as the various composite shapes which may be formed by interconnecting the individual pieces. The package may also show various flavor and/or texture, and or color combinations which may be made by interconnecting the pieces or otherwise combining them in the mouth of the consumer to achieve a desired flavor perception.

Referring now to FIG. 1, an example of a typical package which can contain the candy pieces of the present invention is shown. The package 10 is generally a bag type package formed in conventional fashion and from conventional materials. The bag is formed in a flat blank configuration and may be folded into a package configuration to contain the candy pieces as is well known in the packaging art.

The front panel 12 of package 10 has indicia providing information regarding the candy pieces as well as an illustration showing one example of the interconnection of the candy pieces. Back panels 14 and 16 include other information typically required in selling a candy product such a nutritional information, ingredients and UPC codes. In addition, the back panels 14 and 16 show other examples of the ability to interconnect two or more of the candy pieces.

Figure 2:
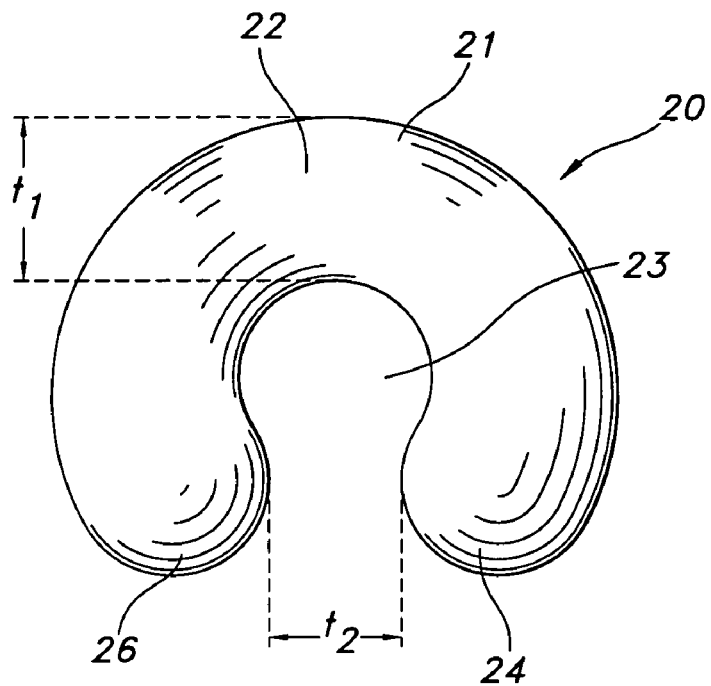
FIG. 2 is a perspective showing of a candy piece of the present invention.

Referring now to FIG. 2, one of the candy pieces 20 of the present invention is shown. Candy piece 20 is generally an elongate member 21 formed into a generally C-shaped configuration. Candy piece 20 has an elongate central portion 22 and a pair of opposed distal ends 24 and 26. As the candy piece 20 is formed in a C-shaped configuration, the distal ends 24 and 26 are in mutual facing relationship defining a gap therebetween. Also, the C-shape defines an internal cavity 23 bounded by elongate member 21.

In the present illustrative embodiment, the elongate central portion 22 of candy piece 20 has a transverse dimension $t_1$. The gap between distal ends 24 and 26 has a gap dimension of $t_2$ which less than $t_1$. As will be described in further detail hereinbelow, this allows two candy pieces 20 to be interconnected together.

In some embodiments, each candy piece 20 may be designed to be resiliently deformable. In the present invention, resiliently deformable is defined to be the ability of the candy piece to be stretched or deformed from its C-shaped configuration shown in FIG. 2 to approximately a straight line shape under a first manual pressure. Once the first manual pressure is released, the candy piece 20 will return to the substantially C-shaped configuration shown in FIG. 2.

Figure 7:
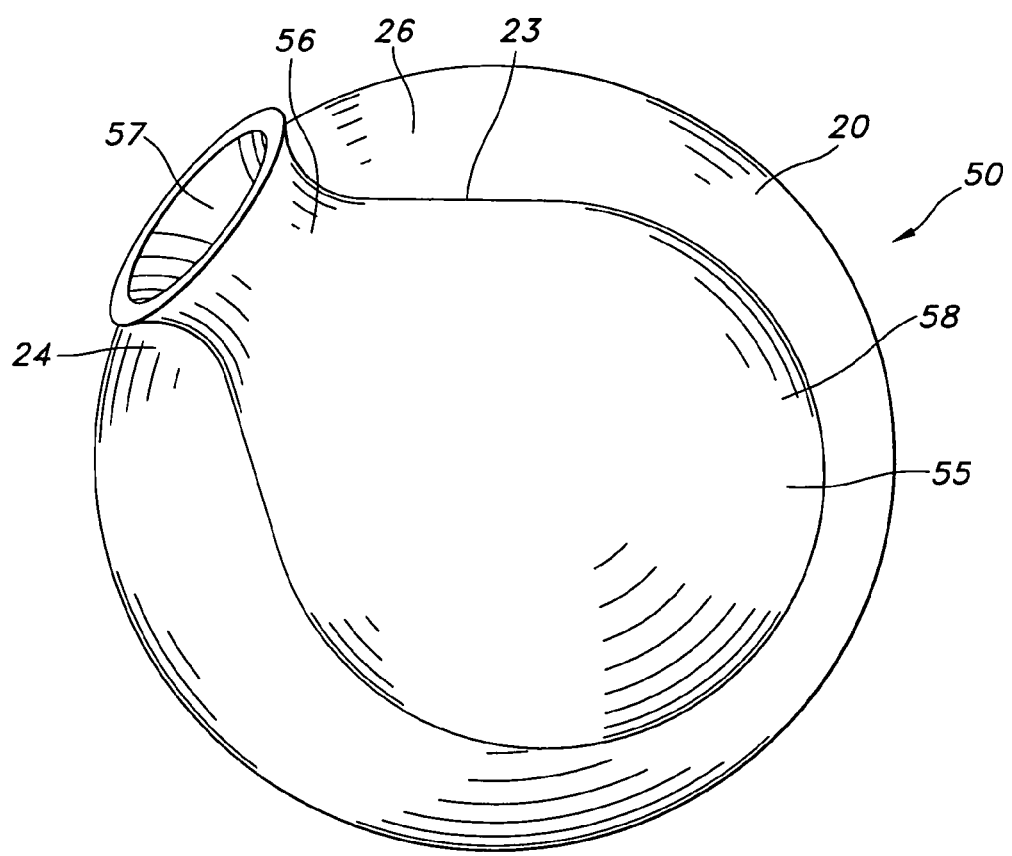
FIG. 7 is a perspective showing of a still further configuration which may be formed from a candy piece of FIG. 2 and a further candy piece which may be inserted into the cavity of the piece of FIG. 2.

In other embodiments, shapes may also be included in the package which may not be deformable, but are shaped to fit into the opening or aperture of another deformable piece, such as shown in FIG. 7. In this Figure, candy piece 55 fits into the aperture of candy piece 20.

Tables 1 and 2 define the resilient capability of the candy pieces 20. As shown in the Tables, both 2 gram and 3 gram pieces were tested for their resilient capability.

TABLE 1

| | 2.0 gm. Pieces | | | | | |
|---|---|---|---|---|---|---|
| Sample # | Initial Gap mm | Straight Length Mm | Stretch Straight – Initial | Final Gap mm | Return Stretch – Final | Resiliency Return/ Stretch * 100 |
| 1 | 0.54 | 35.16 | 34.62 | 8.11 | 26.51 | 76.57 |
| 2 | 1.39 | 35.16 | 33.77 | 5.95 | 27.82 | 82.38 |
| 3 | 1.74 | 35.16 | 33.42 | 7.58 | 25.84 | 77.32 |
| 4 | 3.01 | 35.16 | 32.15 | 9.66 | 22.49 | 69.95 |
| 5 | 2.36 | 35.16 | 32.8 | 8.41 | 24.39 | 74.36 |
| 6 | 2.66 | 35.16 | 32.5 | 6.99 | 25.51 | 78.49 |
| 7 | 2.36 | 35.16 | 32.8 | 7.66 | 25.14 | 76.65 |
| 8 | 1.93 | 35.16 | 33.23 | 6.74 | 26.49 | 79.72 |
| 9 | 2.1 | 35.16 | 33.06 | 9.55 | 23.51 | 71.11 |
| 10 | 2.1 | 35.16 | 33.06 | 9.21 | 23.85 | 72.14 |
| 11 | 2.52 | 35.16 | 32.64 | 9.28 | 23.36 | 71.57 |
| 12 | 1.33 | 35.16 | 33.83 | 6.62 | 27.21 | 80.43 |
| 13 | 1.33 | 35.16 | 33.83 | 7.39 | 26.44 | 78.16 |
| 14 | 0 | 35.16 | 35.16 | 4.75 | 30.41 | 86.49 |
| 15 | 2.23 | 35.16 | 32.93 | 9.04 | 23.89 | 72.55 |
| 16 | 1.95 | 35.16 | 33.21 | 7.7 | 25.51 | 76.81 |
| 17 | 2.23 | 35.16 | 32.93 | 8.91 | 24.02 | 72.94 |
| 18 | 1.96 | 35.16 | 33.2 | 7.81 | 25.39 | 76.48 |
| 19 | 3.53 | 35.16 | 31.63 | 11.46 | 20.17 | 63.77 |
| 20 | 2 | 35.16 | 33.16 | 8.72 | 24.44 | 73.70 |
| 21 | 1.26 | 35.16 | 33.9 | 6.44 | 27.46 | 81.00 |
| 22 | 0.97 | 35.16 | 34.19 | 6.69 | 27.5 | 80.43 |
| 23 | 4.21 | 35.16 | 30.95 | 9.05 | 21.9 | 70.76 |
| 24 | 3.43 | 35.16 | 31.73 | 7.3 | 24.43 | 76.99 |
| 25 | 0 | 35.16 | 35.16 | 5.31 | 29.85 | 84.90 |
| 26 | 1.8 | 35.16 | 33.36 | 6.74 | 26.62 | 79.80 |
| 27 | 3.7 | 35.16 | 31.46 | 8.77 | 22.69 | 72.12 |
| 28 | 3.24 | 35.16 | 31.92 | 11.03 | 20.89 | 65.44 |
| 29 | 0 | 35.16 | 35.16 | 5.36 | 29.8 | 84.76 |
| 30 | 5.01 | 35.16 | 30.15 | 10.39 | 19.76 | 65.54 |
| 31 | 3.05 | 35.16 | 32.11 | 7.63 | 24.48 | 76.24 |
| 32 | 1.46 | 35.16 | 33.7 | 6.49 | 27.21 | 80.74 |
| 33 | 1.49 | 35.16 | 33.67 | 7.27 | 26.4 | 78.41 |
| 34 | 3.43 | 35.16 | 31.73 | 8.27 | 23.46 | 73.94 |
| 35 | 2.64 | 35.16 | 32.52 | 9.38 | 23.14 | 71.16 |
| 36 | 1.52 | 35.16 | 33.64 | 7.95 | 25.69 | 76.37 |
| 37 | 4.34 | 35.16 | 30.82 | 10.55 | 20.27 | 65.77 |
| 38 | 0.6 | 35.16 | 34.56 | 7.39 | 27.17 | 78.62 |

TABLE 2

3.0 gm. Pieces

| Sample # | Initial Gap mm | Straight Length Mm | Stretch Straight − Initial | Final Gap mm | Return Stretch − Final | Resiliency Return/ Stretch * 100 |
|---|---|---|---|---|---|---|
| 1 | 4.93 | 49.5 | 44.57 | 12.29 | 32.28 | 72.43 |
| 2 | 5.71 | 49.5 | 43.79 | 12.29 | 31.5 | 71.93 |
| 3 | 3.56 | 49.5 | 45.94 | 8.99 | 36.95 | 80.43 |
| 4 | 6.34 | 49.5 | 43.16 | 12.34 | 30.82 | 71.41 |
| 5 | 6.34 | 49.5 | 43.16 | 13.56 | 29.6 | 68.58 |
| 6 | 6.34 | 49.5 | 43.16 | 15.02 | 28.14 | 65.20 |
| 7 | 6.82 | 49.5 | 42.68 | 12.37 | 30.31 | 71.02 |
| 8 | 2.6 | 49.5 | 46.9 | 10.82 | 36.08 | 76.93 |
| 9 | 9.29 | 49.5 | 40.21 | 16.32 | 23.89 | 59.41 |
| 10 | 1.95 | 49.5 | 47.55 | 9.57 | 37.98 | 79.87 |
| 11 | 2.74 | 49.5 | 46.76 | 8.18 | 38.58 | 82.51 |
| 12 | 3.13 | 49.5 | 46.37 | 12.02 | 34.35 | 74.08 |
| 13 | 3.99 | 49.5 | 45.51 | 14.75 | 30.76 | 67.59 |
| 14 | 2.41 | 49.5 | 47.09 | 9.12 | 37.97 | 80.63 |
| 15 | 5.63 | 49.5 | 43.87 | 12.8 | 31.07 | 70.82 |
| 16 | 6.97 | 49.5 | 42.53 | 12.81 | 29.72 | 69.88 |
| 17 | 2.46 | 49.5 | 47.04 | 11.6 | 35.44 | 75.34 |
| 18 | 2.66 | 49.5 | 46.84 | 11.81 | 35.03 | 74.79 |
| 19 | 5.57 | 49.5 | 43.93 | 11.72 | 32.21 | 73.32 |
| 20 | 5.17 | 49.5 | 44.33 | 11.29 | 33.04 | 74.53 |
| 21 | 0 | 49.5 | 49.5 | 7.13 | 42.37 | 85.60 |
| 22 | 4.01 | 49.5 | 45.49 | 12.61 | 32.88 | 72.28 |
| 23 | 6.05 | 49.5 | 43.45 | 13.71 | 29.74 | 68.45 |
| 24 | 1.77 | 49.5 | 47.73 | 9.27 | 38.46 | 80.58 |
| 25 | 3.26 | 49.5 | 46.24 | 12.09 | 34.15 | 73.85 |
| 26 | 5.52 | 49.5 | 43.98 | 13.3 | 30.68 | 69.76 |
| 27 | 2.14 | 49.5 | 47.36 | 9.68 | 37.68 | 79.56 |
| 28 | 1.69 | 49.5 | 47.81 | 12.07 | 35.74 | 74.75 |
| 29 | 3.18 | 49.5 | 46.32 | 7.87 | 38.45 | 83.01 |
| 30 | 2.24 | 49.5 | 47.26 | 10.5 | 36.76 | 77.78 |
| 31 | 7.54 | 49.5 | 41.96 | 13.92 | 28.04 | 66.83 |
| 32 | 5.62 | 49.5 | 43.88 | 13.02 | 30.86 | 70.33 |
| 33 | 4.09 | 49.5 | 45.41 | 8.69 | 36.72 | 80.86 |
| 34 | 4.79 | 49.5 | 44.71 | 11.03 | 33.68 | 75.33 |
| 35 | 3.5 | 49.5 | 46 | 11.25 | 34.75 | 75.54 |
| 36 | 3 | 49.5 | 46.5 | 11.15 | 35.35 | 76.02 |
| 37 | 3.55 | 49.5 | 45.95 | 9.03 | 36.92 | 80.35 |
| 38 | 7.64 | 49.5 | 41.86 | 14.01 | 27.85 | 66.53 |
| | | | | | Resiliency | |
| | | | | | Average | 74.90 |
| | | | | | Standard Deviation | 5.59 |
| | | | | | Range | (59.41–86.49) |

With respect to Tables 1 and 2, the products tested are referred as "sour patch connectors" which include 2.0 gram and 3.0 gram pieces. All measurements conducted with respect to Tables 1 and 2 were made using a Mitutoyo Absolute Digimatic Caliper Model CD-15C. The test protocol used for the samples include a sample temperature of 25° C., test room conditions of 25° C. with a 60% relative humidity. Measurements were taken of the initial gap, i.e., the distance between the inside edges of the ends of the connector prior to deformation. The candy pieces were then stretched into a substantially straight line. Once stretched into a substantially straight line the piece was released. The piece returns to a generally C-shaped configuration and the measurement of the final gap, i.e., the distance between the inside edges of the ends of the connector after release were measured. Also, the straight length of the connectors were measured and assumed to be constant for each piece.

In calculating the resiliency, the following criteria was used:

Stretch=stretch length−initial gap.

Return=stretch−final gap.

Percent of resiliency=return over stretch×100.

As a result of the data collected in Table 1, the resiliency of the 2.0 gram connector is 75.65% ±5.49, with a range of 63.77% to 86.49%.

The resiliency of the 3.0 connector as shown in Table 2, is 73.77% ±5.69, with a range of 59.41% to 85.60%. The resiliency of the connectors taking into consideration both piece sizes was found to be 74.90%±5.59 with a range of 59.41% to 86.49%.

In addition to resiliency, the springiness of the candy pieces was also measured. Table 3 shows the results of samples conducted with 3.0 gram pieces.

TABLE 3

| Sample ID | Flavor | Fmax (g) | F60 (g) | Springiness |
|---|---|---|---|---|
| ConnL001 | Lemon | 2369.8 | 397.1 | 16.8 |
| ConnL002 | Bubblegum | 5301.9 | 1117.6 | 21.1 |
| ConnL003 | TropPunch | 4976.3 | 924.8 | 18.6 |
| ConnL004 | Cotton Candy | 6959 | 1472.7 | 21.2 |
| ConnL005 | Blue Rasp | 1718 | 288.6 | 16.8 |
| ConnL006 | StrawMilk | 2115.7 | 474.1 | 22.4 |
| ConnL007 | Tangerine | 1902.4 | 342.2 | 18.0 |
| ConnL008 | Cherry | 1962.6 | 369.9 | 18.8 |
| ConnL009 | Cherry | 1803 | 322 | 17.9 |
| ConnL010 | Tangerine | 2613 | 470.1 | 18.0 |
| ConnL011 | StrawMilk | 1405.8 | 286.4 | 20.4 |
| ConnL012 | Blue Rasp | 1702.7 | 317.8 | 18.7 |
| ConnL013 | Cotton Candy | 3525.9 | 627.6 | 17.8 |
| ConnL014 | TropPunch | 3051.4 | 557.3 | 18.3 |
| ConnL015 | Bubblegum | 4863.3 | 988.1 | 20.3 |
| ConnL016 | Lemon | 1240.2 | 195.9 | 15.8 |
| ConnL017 | StrawMilk | 4088.9 | 958.7 | 23.4 |
| ConnL018 | Cherry | 1882.5 | 378.8 | 20.1 |
| ConnL019 | Lemon | 861 | 139.7 | 16.2 |
| ConnL020 | TropPunch | 3526.2 | 694.4 | 19.7 |
| ConnL021 | BlueRasp | 1158.4 | 189 | 16.3 |
| ConnL022 | Cotton Candy | 2687.7 | 501.6 | 18.7 |
| ConnL024 | StrawMilk | 2338.8 | 454.9 | 19.5 |
| ConnL025 | Cherry | 2518.9 | 511.5 | 20.3 |
| ConnL026 | StrawMilk | 2513 | 600.4 | 23.9 |
| | | | Springiness | |
| | | | Average | 19.2 |
| | | | Standard Deviation | 2.2 |
| | | | Range | (16.2–23.9) |

In conducting the springiness tests, measurements were made using TA-XT2 texture analyzer from Stable Microsystems with a probe attachment of TA-25, a two inch diameter stainless steel probe. Tests were conducted at sample temperature 25° C. and test room conditions of 25° C. and 60% relative humidity. Pre-test speed was 1 mm per second, the test speed was 1 mm per second, and the post-test speed was 10 mm per second. The distance for compression was 2 mm to hold for 60 seconds.

To calculate springiness of the connectors, the force as measured at the end of a 60 second hold period divided by the maximum force value then multiplying it by a 100. Thus, the equation for springiness percentage used was:

$$\text{Springiness\%} = \frac{F_{60} \times 100}{F\max}$$

The overall results of the springiness of the 3.0 gram pieces is 19.2% ±2.2% with a range of 16.2% to 23%.

As indicated by the above referenced tests, the candy pieces 20 of the present invention exhibit resilient deformability.

Figure 3:
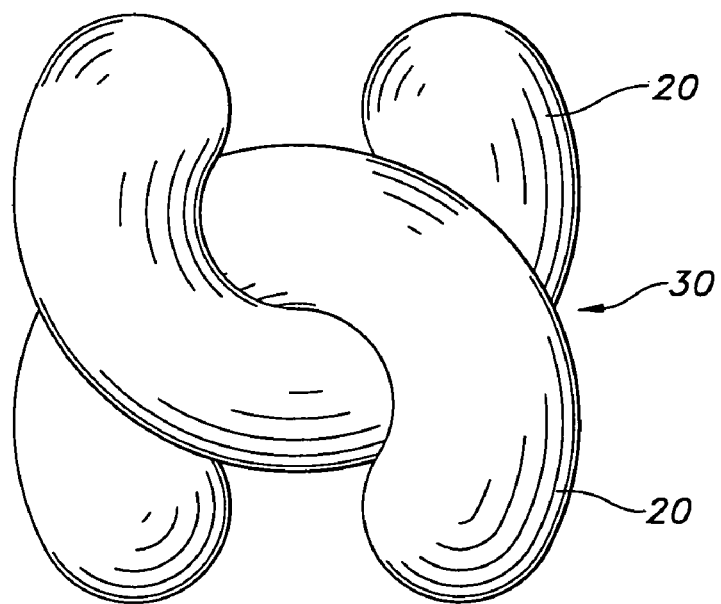
FIGS. 3-6 are perspective showings of examples of composite structures which may be formed from the candy pieces of FIG. 2.

Referring again to FIG. 1, the ability to create interconnected composite products from the candy piece 20 is shown. Back panel 14 includes several examples of techniques to interconnect two or more of the candy pieces 20. For example, shown more fully in FIG. 3, one composite configuration 30 may be formed. In this configuration (referring additionally to FIG. 2), the central portion 22 of one candy piece may be inserted in the gap between ends 24 and 26 of another candy piece. In order to effect such interconnection, the gap is widened to allow passage of the central portion 22 therein. Due to the resiliency of the candy, the candy piece returns to its near original condition returning the gap to the final gap dimension thereby interlocking the central portion 22 of one candy piece within the cavity 23 of another identically formed candy piece.

Figure 4:
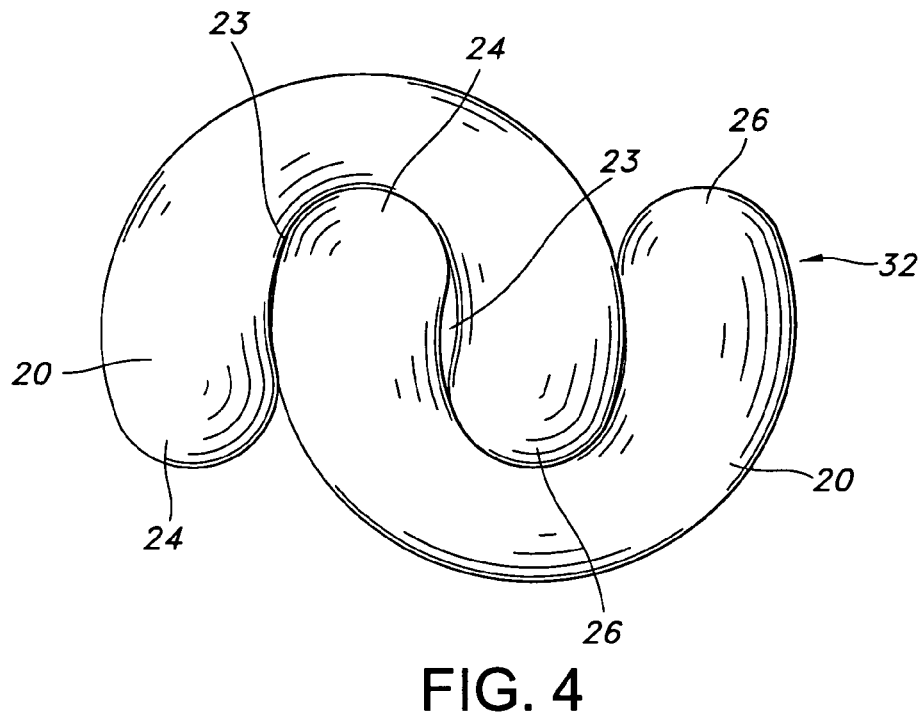

A second composite configuration 32 is shown further in FIG. 4. In this arrangement, the ends 24, 26 of two pieces 20 are mutually interlocked so that the end 24 of one piece is positioned within the central cavity 23 of another piece, and likewise, the end 26 of the other piece is positioned within the central cavity 23 of the first piece.

Figure 5:
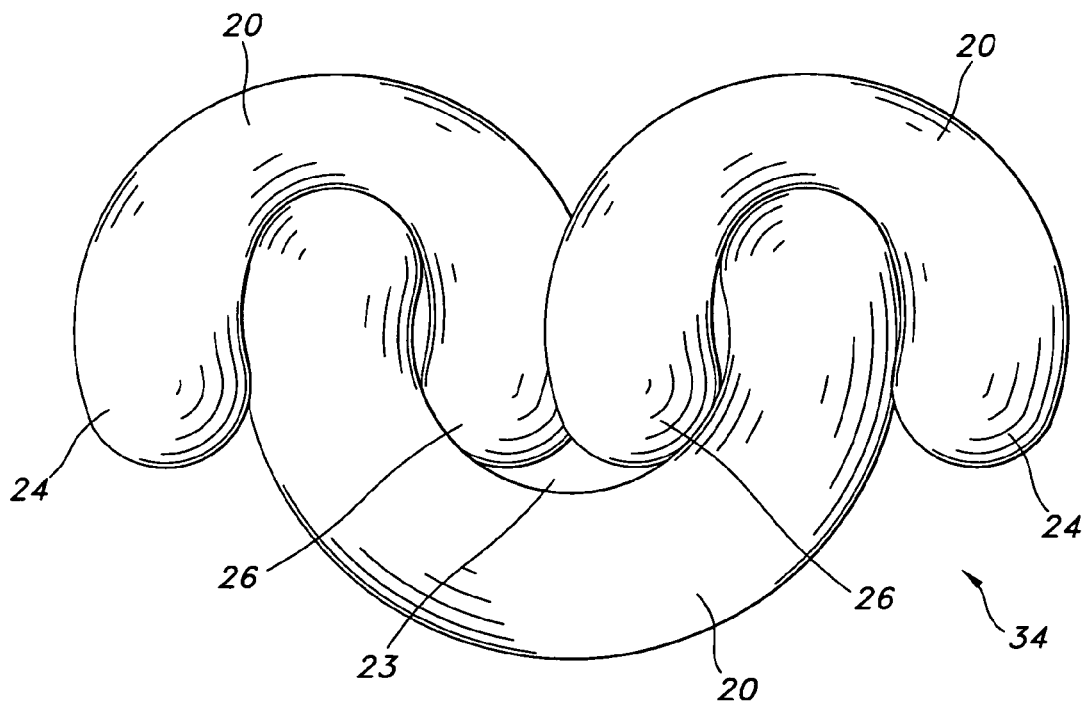

It is similarly contemplated that as further shown in FIG. 5, three individual candy pieces can be formed into a configuration 34 in the same manner. In this embodiment, ends 26 of two candy pieces may be mutually supported in the central cavity 23 of a third candy piece.

Figure 6:
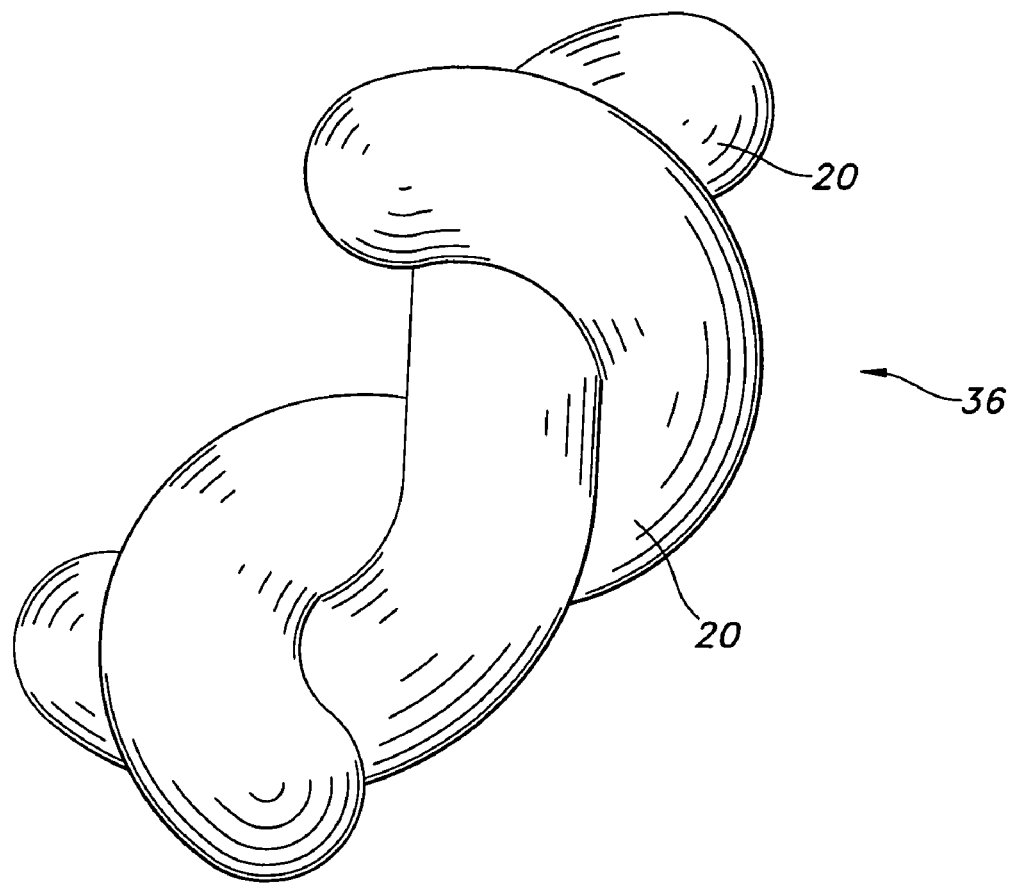

Referring to back panel 16, and also to FIG. 6, a still further example of a composite configuration is shown. It is contemplated that two or more candy pieces 20 can be twisted together to interlock the pieces into a further configuration 40. In this configuration, the candy is deformed to such an extent and with such an applied force that the interconnected pieces will not return to their original C-shaped configuration. Thus, two or more candy pieces can be twisted together with a force that will maintain the twisted configuration and maintain the interconnected configuration 40 in a substantially elongate arrangement.

Another example of a composite configuration which may be formed from the candy pieces of the present invention is shown in FIG. 7. Composite configuration 50 includes the "C" shape candy piece 20 of the type shown in FIG. 2 where a further type of candy piece 55 may be inserted into the central cavity 23 thereof. Candy piece 55 may be a candy piece having a liquid or semi-liquid center. The candy piece is formed to have a balloon shape including a neck portion 56 defining a open end 57. It is contemplated that the bulbous portion 58 of candy piece 55 may be inserted into the "C" shaped cavity with the neck portion 56 residing within the gap between ends 24 and 26 of candy piece 20. The open end 57 may expel the liquid or semi-liquid candy contained within the bulbous portion 58 upon consumption.

As shown in FIG. 1, the candy pieces may be marketed in a package 10 which shows examples of one of the plurality of configurations that the composite structures may take. Moreover, the packaging 10 may also include flavor and texture information which will assist in or provide examples of various flavor combinations which can be created with the candy pieces.

EXAMPLES

The following compositions were prepared:

| Ingredient | LEMON % | BLUE RASP % | TANGE- RINE % | CHERRY % | BUBBLE GUM % | COTTON CANDY % | STRW MILK % | TROP PUNCH % |
|---|---|---|---|---|---|---|---|---|
| Water | 11.7–15.0 | 11.7–15.0 | 11.7–15.0 | 11.7–15.0 | 11.5–15.0 | 11.5–15.0 | 11.5–15.0 | 11.5–15.0 |
| Sugar | 49.3–55.0 | 49.2–55.0 | 49.3–55.0 | 49.3–55.0 | 51.2–55.0 | 51.2–55.0 | 51.1–55.0 | 51.2–55.0 |
| Glucose 63 DE | 10.8–16.0 | 10.8–16.0 | 10.8–16.0 | 10.8–16.0 | 10.7–16.0 | 10.7–16.0 | 10.7–16.0 | 10.7–16.0 |
| Invert Sugar | 16.8–20.0 | 16.7–20.0 | 16.8–20.0 | 16.8–20.0 | 16.6–20.0 | 16.6–20.0 | 16.6–20.0 | 16.6–20.0 |
| Thin Boiling Starch | 8.9–14.0 | 8.8–14.0 | 8.9–14.0 | 8.9–14.0 | 8.8–14.0 | 8.8–14.0 | 8.8–14.0 | 8.8–14.0 |
| Citric Acid | 1.1–1.6 | 1.1–1.6 | 1.1–1.6 | 1.1–1.6 | 0.53–1.0 | 0.53–1.0 | | 0.53–1.0 |
| Tartaric Acid | 0.9–1.5 | 0.9–1.5 | 0.9–1.5 | 0.9–1.5 | | | | |
| Lactic Acid | | | | | | | 0.77–1.5 | |
| Purple Color | | | | | | | | 0.0080–0.010 |
| Yellow Color | 0.006–0.09 | | | | | | | |
| Liquicert Blue | | 0.0484–0.8 | | | | 0.0065–0.09 | | |
| Orange Color | | | 0.0256–0.05 | | | | | |
| US Red #40 | | | | 0.016–0.04 | 0.0010–0.009 | | 0.007–0.010 | |
| White Color (TI02) | | | | | 0.026–0.05 | 0.026–0.05 | 0.026–0.05 | 0.026–0.05 |

-continued

| Ingredient | LEMON % | BLUE RASP % | TANGERINE % | CHERRY % | BUBBLE GUM % | COTTON CANDY % | STRW MILK % | TROP PUNCH % |
|---|---|---|---|---|---|---|---|---|
| Lemon Flavor | 0.0812–0.15 | | | | | | | |
| Lemon Flavor | 0.0812–0.15 | | | | | | | |
| Blue Rasp. Flavor | | 0.4459–0.8 | | | | | | |
| Tangerine Flavor | | | 0.1892–0.90 | | | | | |
| Cherry Flavor | | | | 0.027–0.09 | | | | |
| Cherry Flavor | | | | 0.110–1.0 | | | | |
| Bubble Gum Flv, Glv | | | | | 0.288–0.9 | | | |
| Cotton Candy | | | | | | 0.33–0.9 | | |
| Straw. Milk. Flavor | | | | | | | 0.22–0.9 | |
| Tropical Punch Flv | | | | | | | | 0.31–1.0 |
| TOTAL | 100 | 100 | 100 | 100 | 100 | 100 | 100 | 100 |

Compositions made in accordance with the above illustrations of various embodiments of the inventive compositions exhibited the deformable resilient characteristics in accordance with the invention.

The invention claimed is:
1. A composite confectionery product comprising:
    at least two resilient members having an outer surface, each of said members comprising about 11.7% to about 15% water, about 49.2% to about 55% sugar, about 10.7% to about 16% glucose, about 16.6% to about 20% invert sugar, and about 4% to about 14% thin boiling starch and having a resiliency of about 59% to about 86%, wherein each of said members having an elongate central portion having a transverse dimension (t1) and two opposed distal ends, said opposed distal ends being separated by a gap (t2), each member having a first curved configuration in a general C-shape, wherein the gap between said opposed distal ends (t2) is less than the transverse dimension of the elongate central portion (t1), said members being deformable under an applied manual pressure to a second configuration different from said first configuration, and substantially returnable as a result of said resiliency upon release of said manual pressure to said first configuration, wherein resiliency is a measure of said member's ability to return to the first curved configuration from a stretched substantially straight line configuration, measured as a distance between said distal ends of said member,
    said members being engagable with each other in said second configuration so that upon release of said manual pressure said members substantially return to said first configuration and become interconnected, and
    wherein the outer surface of each of said members is coated with a particulate coating selected from the group consisting of sweetener granules, acid granules, and sweetener/acid granules, which particulate coating provides frictional engagement when the members are interconnected.

2. The product of claim 1, wherein said resilient members are 74.90% ±5.59% returnable to said first configuration upon release of said manual pressure.

3. The product of claim 1, wherein said members further comprise a springiness from about 16% to about 23%.

4. The product of claim 1, wherein said particulate coating comprises acid granules, which particulate coating permits frictional engagement when the members are interconnected.

5. The product of claim 1, wherein said elongate central portion and said two opposed distal ends define an internal cavity, and wherein the elongate central portion of one member may be interlocked within the internal cavity of a second member.

6. The product of claim 1, wherein said elongate central portion and said two opposed distal ends define an internal cavity, and wherein a distal end of a first member may be interlocked within the internal cavity of a second member.

7. The product of claim 6, wherein a distal end of the second member may be interlocked within the internal cavity of the first member while the distal end of the first member is interlocked within the internal cavity of the second member.

8. A method of making a composite confectionery product, comprising the steps of:
    selecting at least two resilient members having an outer surface, each having an elongate central portion having a transverse dimension (t1) and two opposed distal ends, said opposed distal ends being separated by a gap (t2), each member further having a first curved configuration in a general C-shape, wherein the gap between said opposed distal ends (t2) is less than the transverse dimension of the elongate central portion (t1), wherein resiliency is a measure of each of said member's ability to return to the first curved configuration from a stretched substantially straight line configuration, each of said members comprising about 11.7% to about 15% water, about 49.2% to about 55% sugar, about 10.7% to about 16% glucose, about 16.6% to about 20% invert sugar, and about 4% to about 14% thin boiling starch and having a resiliency of about 59% to about 86%;

applying a manual pressure to said members to deform said members from said first curved configuration to a second configuration different from said first configuration;

engaging said members with each other in said second configuration; and releasing said manual pressure from said members so that said members substantially return to said first curved configuration as a result of said resiliency and become interconnected, wherein the outer surface of each of said members is coated with a particulate coating selected from the group consisting of sweetener granules, acid granules, and sweetener/acid granules, which particulate coating provides frictional engagement when the members are interconnected.

9. The method of claim 8, wherein said resilient members are 74.90% ±5.59% returnable to said first configuration upon release of said manual pressure.

10. The method of claim 8, wherein said members further comprise a springiness from about 16% to about 23%.

11. The method of claim 8, wherein said particulate coating comprises acid granules, which particulate coating permits frictional engagement when the members are interconnected.

12. The method of claim 8, wherein said elongate central portion and said two opposed distal ends define an internal cavity, and wherein the elongate central portion of one member may be interlocked within the internal cavity of a second member.

13. The method of claim 8, wherein said elongate central portion and said two opposed distal ends define an internal cavity, and wherein a distal end of a first member may be interlocked within the internal cavity of a second member.

14. The method of claim 13, wherein a distal end of the second member may be interlocked within the internal cavity of the first member while the distal end of the first member is interlocked within the internal cavity of the second member.

* * * * *